(12) United States Patent
Deng et al.

(10) Patent No.: US 9,092,856 B2
(45) Date of Patent: Jul. 28, 2015

(54) RECURSIVE DE-BANDING FILTER FOR DIGITAL IMAGES

(71) Applicant: STMicroelectronics Asia Pacific Pte. Ltd., Singapore (SG)

(72) Inventors: Xiaoyun Deng, Guangzhou (CN); Lucas Hui, Isuites @ Tani (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 134 days.

(21) Appl. No.: 14/068,656

(22) Filed: Oct. 31, 2013

(65) Prior Publication Data

US 2015/0117793 A1 Apr. 30, 2015

(51) Int. Cl.
*G06K 9/40* (2006.01)
*G06T 5/00* (2006.01)

(52) U.S. Cl.
CPC ....... *G06T 5/002* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 4,377,821 A * | 3/1983 | Sautter et al. | 348/472 |
| 5,210,623 A * | 5/1993 | Weldy | 358/3.26 |
| 5,737,453 A * | 4/1998 | Ostromoukhov | 382/275 |
| 7,747,100 B2 * | 6/2010 | Kim et al. | 382/275 |
| 8,471,962 B2 | 6/2013 | Deng et al. | |
| 8,750,390 B2 * | 6/2014 | Sun et al. | 375/240.29 |
| 2002/0181797 A1 * | 12/2002 | Young | 382/260 |
| 2003/0086623 A1 * | 5/2003 | Berkner et al. | 382/260 |
| 2003/0142878 A1 * | 7/2003 | Willis et al. | 382/269 |
| 2004/0087856 A1 * | 5/2004 | Panda et al. | 600/443 |
| 2006/0233456 A1 * | 10/2006 | Ahn et al. | 382/275 |
| 2008/0123979 A1 | 5/2008 | Schoner | |
| 2009/0226112 A1 * | 9/2009 | Park et al. | 382/266 |
| 2009/0273716 A1 * | 11/2009 | Wu | 348/607 |
| 2010/0066912 A1 | 3/2010 | Kumwilaisak et al. | |
| 2013/0128122 A1 | 5/2013 | Wang et al. | |
| 2013/0235931 A1 * | 9/2013 | Su et al. | 375/240.12 |
| 2015/0092847 A1 * | 4/2015 | Su et al. | 375/240.12 |

* cited by examiner

*Primary Examiner* — Wenpeng Chen
(74) *Attorney, Agent, or Firm* — Allen, Dyer, Doppelt, Milbrath & Gilchrist, P.A.

(57) ABSTRACT

A method and apparatus are provided for filtering banding noise in a signal representative of an image. The method includes detecting, by a banding noise detector, banding noise in a neighborhood of a current pixel of the image, determining, by an adaptive filter weight decision unit, a number of banding steps in the neighborhood of the current pixel, determining, by the adaptive filter weight decision unit, a difference between a current pixel value and a previous output value, selecting, by the adaptive filter weight decision unit, a filter weight based on the number of banding steps, the difference between the current pixel value and the previous output value, and the detected banding noise, and filtering, by a recursive filter, the current pixel value according to the selected filter weight.

19 Claims, 6 Drawing Sheets

| ALUT | $\varepsilon=0$ | $\varepsilon=1$ | $\varepsilon=2$ | $\varepsilon=3$ | $\varepsilon=4$ ($\varepsilon_{max}$) |
|---|---|---|---|---|---|
| Steps=0 | 28 | 28 | 28 | 28 | 28 |
| Steps=1 | 28 | 28 | 28 | 28 | 28 |
| Steps=2 | 24 | 28 | 28 | 28 | 28 |
| Steps=3 | 20 | 24 | 28 | 28 | 28 |
| Steps=4 (Steps$_{max}$) | 16 | 20 | 24 | 28 | 28 |

FIG. 4

RECURSIVE DE-BANDING FILTER FOR DIGITAL IMAGES

BACKGROUND

1. Technical Field

This disclosure relates to digital video processing methods and apparatus. More particularly, the disclosure relates to image quality improvement by removal of banding artifacts, also known as banding noise.

2. Discussion of the Related Art

Banding artifacts, or banding noise, in a digital image or video sequence can be caused by quantization of gray scale values or color values and may appear as a false contour effect in a smooth region of the image. False contours may appear as bands in a uniform or continuously varying area of the image.

Techniques have been proposed for removing banding artifacts from digital images. In one approach, a method for detecting digital contours utilizes a selected one of a plurality of search window sizes based on a corresponding variance of the image, and removes the digital contour by using a low pass filter matched to the selected search window size. Another approach utilizes a block based texture/flat area classification by analyzing the coded block maximum/minimum edge value and utilizing a debanding filter with adaptive window size based on the texture/flat classification results.

Conventional debanding techniques have various drawbacks, including but not limited to undesired side effects on image quality and high implementation cost. The effectiveness of known debanding filters increases with filter kernel size, but large filters have a high implementation cost. Accordingly, there is the need for improved methods and apparatus for filtering banding noise in digital image signals.

SUMMARY

According to one embodiment, a method is provided for filtering banding noise in a signal representative of an image. The method comprises detecting, by a banding noise detector, banding noise in a neighborhood of a current pixel of the image, determining, by an adaptive filter weight decision unit, a number of banding steps in the neighborhood of the current pixel, determining, by the adaptive filter weight decision unit, a difference between a current pixel value and a previous output value, selecting, by the adaptive filter weight decision unit, a filter weight based on the number of banding steps, the difference between the current pixel value and the previous output value, and the detected banding noise, and filtering, by a recursive filter, the current pixel value according to the selected filter weight.

In some embodiments, determining the number of banding steps comprises determining a count of increment steps in pixel values and a count of decrement steps in pixel values along a filter direction in the neighborhood of the current pixel and determining the number of banding steps in the neighborhood of the current pixel based on the count of increment steps and the count of decrement steps.

In some embodiments, the method further comprises controlling the selected filter weight near a boundary between a banding noise zone and a texture zone to produce a desired transition of filter weights between the banding noise zone and the texture zone.

In some embodiments, the method further comprises controlling the selected filter weight near a boundary between a banding noise zone and a texture zone based on a distance between the current pixel and a nearest pixel in the texture zone.

In some embodiments, the method further comprises performing the detecting, the determining, the selecting and the filtering for each pixel of the image in a vertical direction.

In some embodiments, selecting a filter weight comprises accessing a look-up table of filter weights based on the number of banding steps and the difference between the current pixel value and the previous output value.

In some embodiments, filtering the current pixel value comprises filtering the current pixel value with an infinite impulse response filter.

In some embodiments, filtering the current pixel value further comprises performing error diffusion of the current pixel. In some embodiments, performing error diffusion comprises receiving an accumulated error from a previous pixel, diffusing the error to the current pixel with an amount not exceeding the error threshold, resetting the error if the error is fully diffused or adjusting the error with the diffused amount if the error is not fully diffused, and accumulating the error of the current pixel.

According to another embodiment, apparatus is provided for filtering banding noise in a signal representative of an image. The apparatus comprises a banding noise detector configured to detect banding noise in a neighborhood of a current pixel of the image; an adaptive filter weight decision unit configured to: determine a number of banding steps in the neighborhood of the current pixel; determine a difference between a current pixel value and a previous output value; and select a filter weight based on the number of banding steps and the difference between the current pixel value and the previous output value, and the detected banding noise; and a recursive debanding filter configured to filter the current pixel value according to the selected filter weight.

BRIEF DESCRIPTION OF DRAWINGS

For a better understanding of the embodiments, reference is made to the accompanying drawings, which are incorporated herein by reference and in which:

FIG. 4 is a schematic diagram of a look-up table for adaptively selecting a filter weight, in accordance with embodiments;

DETAILED DESCRIPTION

Figure 1:
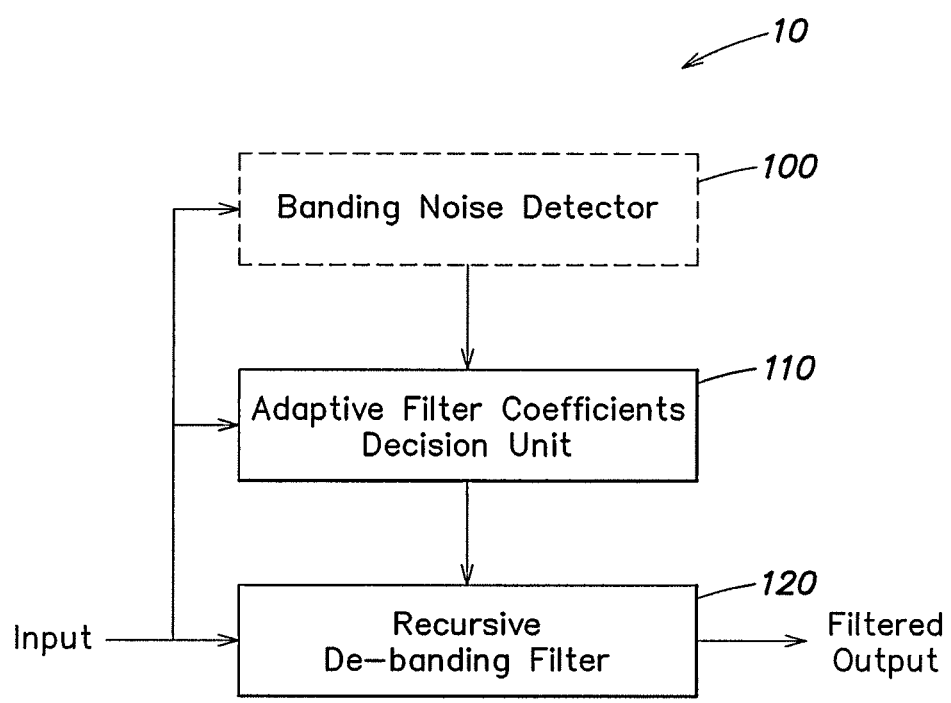
FIG. 1 is a schematic block diagram of apparatus for filtering banding noise in a digital image signal, in accordance with embodiments.

A schematic block diagram of apparatus for filtering banding noise in a digital image signal in accordance with embodiments is shown in FIG. 1 A debanding apparatus 10 receives a digital image input signal and provides a filtered output signal. The debanding apparatus 10 may be part of a set-top box or a digital television, but is not limited to these applications. The debanding apparatus 10 may be implemented, for example, in a "system-on-chip" (SOC) integrated circuit or as an application-specific integrated circuit (ASIC). In further embodiments, the debanding apparatus may be implemented as a processing device and a computer-readable storage device encoded with instructions that, when executed by the processing device, perform debanding as described herein.

Referring again to FIG. 1, a digital image input signal is provided to a banding noise detector 100, to an adaptive filter weight decision unit 110 and to a recursive debanding filter 120. The banding noise detector 100 detects banding noise in the digital image and provides banding noise information to adaptive filter weight decision unit 110. The banding noise information may include, but is not limited to, classification of pixels as banding noise or texture, location of banding noise, etc. Based on the banding noise information and a previous output value of the debanding filter, the adaptive filter weight decision unit 110 provides filter weight information to recursive debanding filter 120. The recursive debanding filter 120 filters the digital image input signal according to the selected filter weight and provides a filtered output.

Figure 2:
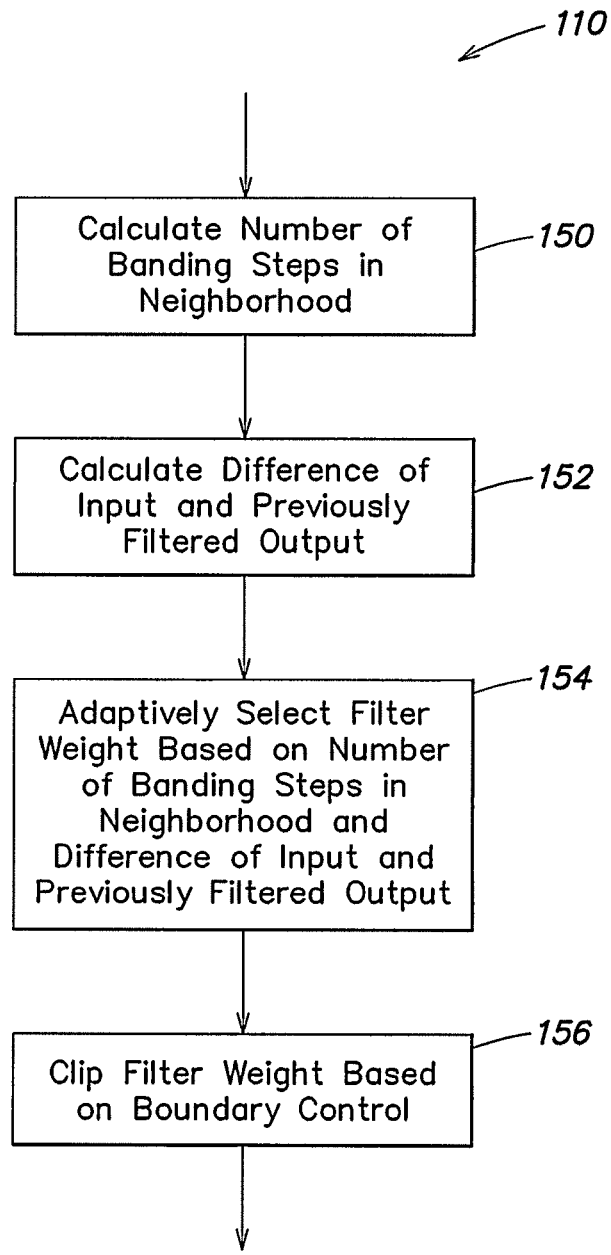
FIG. 2 is a flow chart of a process performed by the adaptive filter weight decision unit of FIG. 1, in accordance with embodiments.

A flow chart of a process performed by the adaptive filter weight decision unit 110 in accordance with embodiments is shown in FIG. 2. The debanding filter may perform filtering by processing each pixel of the image to provide a filtered image. The processing may proceed in a vertical direction of the image, by processing each column of pixels in succession.

Referring again to FIG. 2, the adaptive filter weight decision unit 110 receives from banding noise detector 100 an indication whether the current pixel is within a banding noise zone of the image. If the current pixel is outside a banding noise zone, operation of the debanding filter is not required. If the current pixel is within a banding noise zone, a number of banding steps in a neighborhood N of the current pixel is calculated in act 150. The calculation of the number of banding steps in the neighborhood of the current pixel is described below.

In act 152, a difference between the current pixel value and a previously filtered output value is calculated. In particular, the difference between the current pixel value and the filtered output value for the immediately previous pixel in the direction of processing is calculated. Thus, for example, if the current pixel has coordinates (x, y), the filtered output value for the pixel at coordinates (x, y−1) is utilized in the calculation.

In act 154, the filter weight is adaptively selected based on the number of banding steps in the neighborhood, as determined in act 150, and the difference between the current pixel value and the previously filtered output value, as determined in act 152. Selection of the filter weight is described below.

In act 156, the selected filter weight may be clipped, or adjusted, based on a boundary control function. In particular, the filter weight may be clipped in a boundary region between a banding noise zone of the image and a non-banding noise zone, in order to avoid an abrupt transition in filter weights. Such an abrupt transition in filter weights may potentially be noticeable in the filtered image. It will be understood that clipping of filter weights in act 156 is optional and may be omitted in some implementations. Thus, in some implementations, the selected filter weight may be provided directly from act 154 to the debanding filter. In other implementations, the clipped filter weight is provided from act 156 to the debanding filter. In general, the clipping of filter weights provides a gradual transition of filter weights across a boundary between a banding noise zone and a non-banding noise zone. The clipping of filter weights is discussed below.

Figure 3:
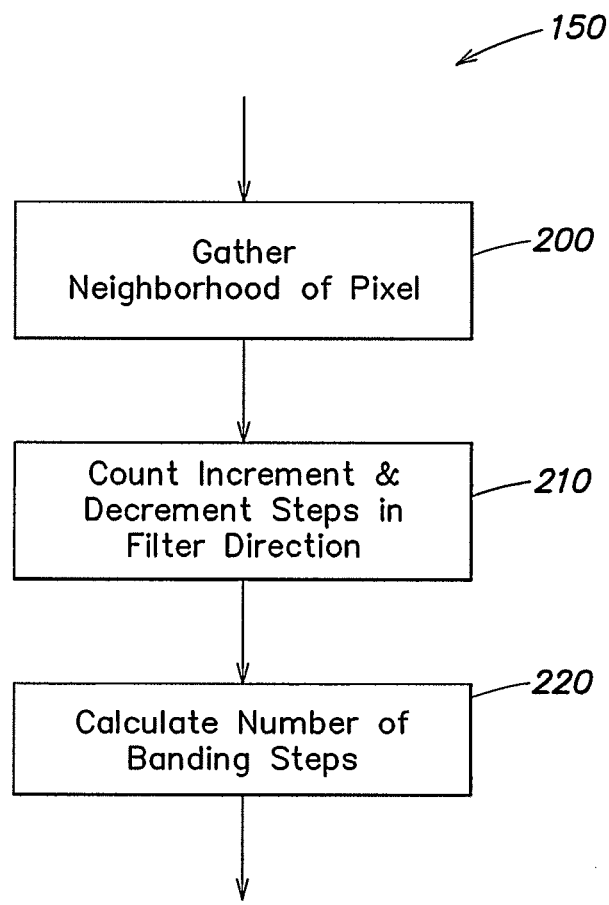
FIG. 3 is a flow chart of a process for calculating the number of banding steps in a neighborhood of a current pixel, in accordance with embodiments.

A flow chart of a process for calculating the number of banding steps in the neighborhood of the current pixel in accordance with embodiments is shown in FIG. 3. In act 200, the pixel data in the neighborhood N of the current pixel is gathered and stored, for example, in a buffer. The neighborhood N of the current pixel may have dimensions of 1×H or W×H, where H is the height of the neighborhood in pixels and W is the width of the neighborhood in pixels. The dimensions of the neighborhood, W and H, may be selected based on the image resolution. For example, H=16 and W=4 for typical High Definition or Standard Definition video.

In act 210, the number of increment steps in pixel values is counted, and the number of decrement steps in pixel values is counted along the filter direction in the specified neighborhood of the current pixel. The count of increment steps and the count of decrement steps may be determined as follows:

$$Cp(x, y) = \sum_{(x,y) \in N} [(I(x, y) > I(x, y-1))?1:0] \quad (1)$$

$$Cn(x, y) = \sum_{(x,y) \in N} [(I(x, y) < I(x, y-1))?1:0] \quad (2)$$

where $Cp(x,y)$ represents the count of increment steps in the filter direction, $Cn(x,y)$ represents the count of decrement steps in the filter direction, and $I(x,y)$ represents the pixel value at coordinates (x,y) in the image.

An alternate technique for counting increment steps and decrement steps in the filter direction may be utilized to reduce the line storage of the image to 1/W. This results from the fact that the increments steps and decrement steps are calculated in a vertical direction, whereas image data is typically stored as horizontal lines. A reduction of line storage can be achieved when the count of increment steps and the count of decrement steps are determined as follows:

$$Cp(x, y) = \quad (3)$$

$$Cp\left(\left\lfloor\frac{x}{W}\right\rfloor, y\right) = \sum_{j \in [-(H-1), 0]} \left[\left(\sum_{i \in [0, W-1]} \left[\left(I\left(\left\lfloor\frac{x}{W}\right\rfloor \times W + i, y + j\right)\right. \right.\right.\right.$$

$$\left.\left.\left.> I\left(\left\lfloor\frac{x}{W}\right\rfloor \times W + i, y + j - 1\right)\right)?1:0\right]\right) > 0?1:0\right]$$

$$Cn(x, y) = \quad (4)$$

$$Cn\left(\left\lfloor\frac{x}{W}\right\rfloor, y\right) = \sum_{j \in [-(H-1), 0]} \left[\left(\sum_{i \in [0, W-1]} \left[\left(I\left(\left\lfloor\frac{x}{W}\right\rfloor \times W + i, y + j\right)\right. \right.\right.\right.$$

$$\left.\left.\left.< I\left(\left\lfloor\frac{x}{W}\right\rfloor \times W + i, y + j - 1\right)\right)?1:0\right]\right) > 0?1:0\right]$$

In act 220, the number of banding steps in the neighborhood of the current pixel along the filter direction is calculated. The number of banding steps is calculated as follows:

$$\text{Steps} = \max(Cp(x,y), Cn(x,y)) - \min(Cp(x,y), Cn(x,y)) \quad (5)$$

The number of banding steps is used in the selection of filter weights as described below.

Referring again to FIG. 2, the difference between the current pixel value and the previously filtered output value is determined in act 152. The difference $\epsilon$ may be calculated as follows:

$$\epsilon = |I(x,y) - F_v(x, y-1)| \quad (6)$$

where I(x,y) is the current pixel value at coordinates (x,y) and $F_v(x,y-1)$ is the filtered output value of the previous pixel at coordinates (x,y-1).

As shown in FIG. 2, a filter weight is adaptively selected in act 154 based on the number of banding steps in the neighborhood of the current pixel, as determined in act 150, and the difference between the input pixel value and the previously filtered output value, as determined in act 152. In some embodiments, the filter weight is selected by use of a look-up table. An example of a look-up table 300 is shown in FIG. 4. The look-up table 300 provides a filter weight for each combination of a number of banding steps and a difference between the current pixel value and the previously filtered output value.

In the look-up table 300, the number of banding steps is shown in the left column 310, and the difference between the current pixel value and the previously filtered output value is shown in the top row 320. The determined number of banding steps and the determined difference between the current pixel value and the previously filtered output value are used to access a value in look-up table 300. For example, where the number of banding steps=1 and the difference=2, the selected filter weight is 28. Where the number of banding steps=4 and the difference=1, the selected filter weight is 20. It will be understood that different look-up tables may be utilized within the scope of the invention, and that the look-up table 300 shown in FIG. 4 is only one example of a look-up table. For example, different numbers of steps may be utilized, different numbers of difference values may be utilized, and different filter weights may be utilized.

Figure 5:
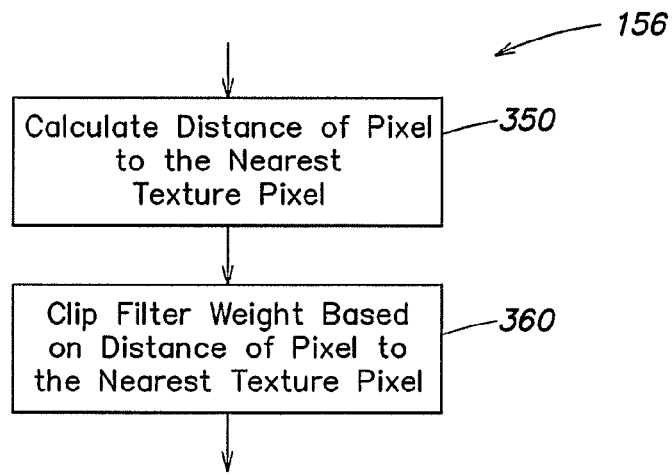
FIG. 5 is a flow chart of a process for clipping filter weights based on boundary control, in accordance with embodiments.

A flow chart of a process for clipping the selected filter weight based on boundary control (act 156 in FIG. 2) in accordance with embodiments is shown in FIG. 5. As indicated above, the boundary control may provide a gradual transition of filter weights at the boundary of a banding noise zone. In act 350, a distance between the current pixel and the nearest texture pixel is calculated. In act 360, the selected filter weight from look-up table 300 is clipped, or adjusted, based on the calculated distance between the current pixel and nearest texture pixel.

Figure 6:
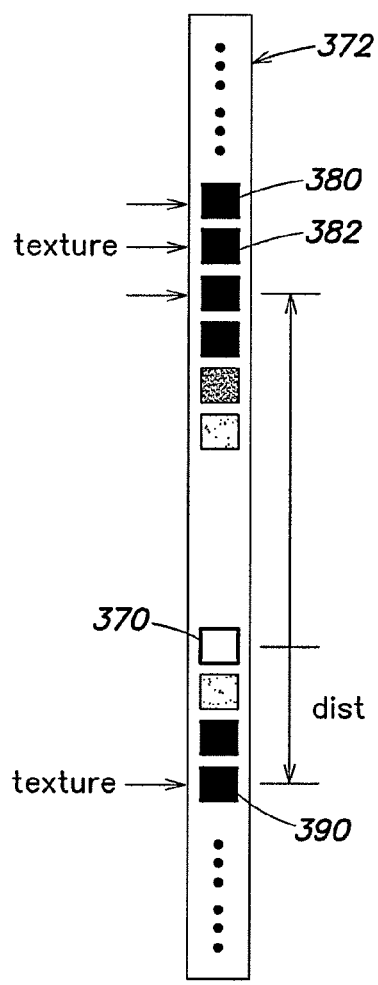
FIG. 6 is a schematic diagram that illustrates calculation of a distance between a current pixel and a nearest texture pixel.

The calculation of the distance to the nearest texture pixel is illustrated in FIG. 6, where a current pixel 370 is located in a vertical neighborhood 372. Texture pixels 380 and 382 are located above current pixel 370, and a texture pixel 390 is located below current pixel 370. Since texture pixel 390 is the nearest texture pixel to current pixel 370, the selected filter weight is clipped according to the distance between current pixel 370 and nearest texture pixel 390. The distance to the nearest texture pixel may be determined as follows:

$$\text{dist}(x,y) = \min\{d | [\text{TextureClass}(x,y+d)=1 \cup \text{TextureClass}(x,y-d)=1]\} \quad (7)$$

where dist(x,y) represents the distance to the nearest texture pixel, and TextureClass(x,y+d) represents the locations of texture pixels. In act 360, the selected filter weight may be clipped according to a predetermined scaling factor based on the calculated distance to the nearest texture pixel. The clipped filter weight may be calculated as follows:

$$A(x,y) = \min(A_{max}, \text{dist}(x,y) \times \delta) \quad (8)$$

where $A_{max}$ is the maximum weight allowed for the pixel (x,y) selected from the weight selection lookup table and before boundary control is applied. When A(x,y)=0, there is no filtering at the pixel.

In some embodiments, the recursive debanding filter 120 shown in FIG. 1 may be implemented as a 2-tap infinite impulse response (IIR) filter in a vertical direction. A sigma filter which controls banding noise by a sigma threshold provides texture and detail protection. The sigma threshold may represent the assumed banding noise, i.e., it is assumed that the banding noise will not exceed the sigma threshold. As described above, adaptive filter coefficient A(x,y) is based on the number of banding steps, the difference between the input pixel value and the previously filtered output value, and, optionally, boundary control as described above. In the recursive debanding filter the current pixel value is controlled to provide a modified pixel value I'(x,y-1) as follows:

$$I'(x, y-1) = \begin{cases} I(x, y) + \sigma & \text{if } F_v(x, y-1) > I(x, y) + \sigma \\ I(x, y) - \sigma & \text{if } F_v(x, y-1) < I(x, y) - \sigma \\ F_v(x, y-1) & \text{otherwise} \end{cases} \quad (9)$$

The filter function $F_v(x,y)$ is given by $$F_v(x, y) = \frac{[32 - A(x, y)] \cdot I(x, y) + A(x, y) \cdot I'(x, y-1)}{32} \quad (10)$$

where, as noted above, A(x,y) is the adaptively selected filter coefficient. The value of $F_v(x,y)$ represents the filtered output of the recursive debanding filter.

Figure 7:
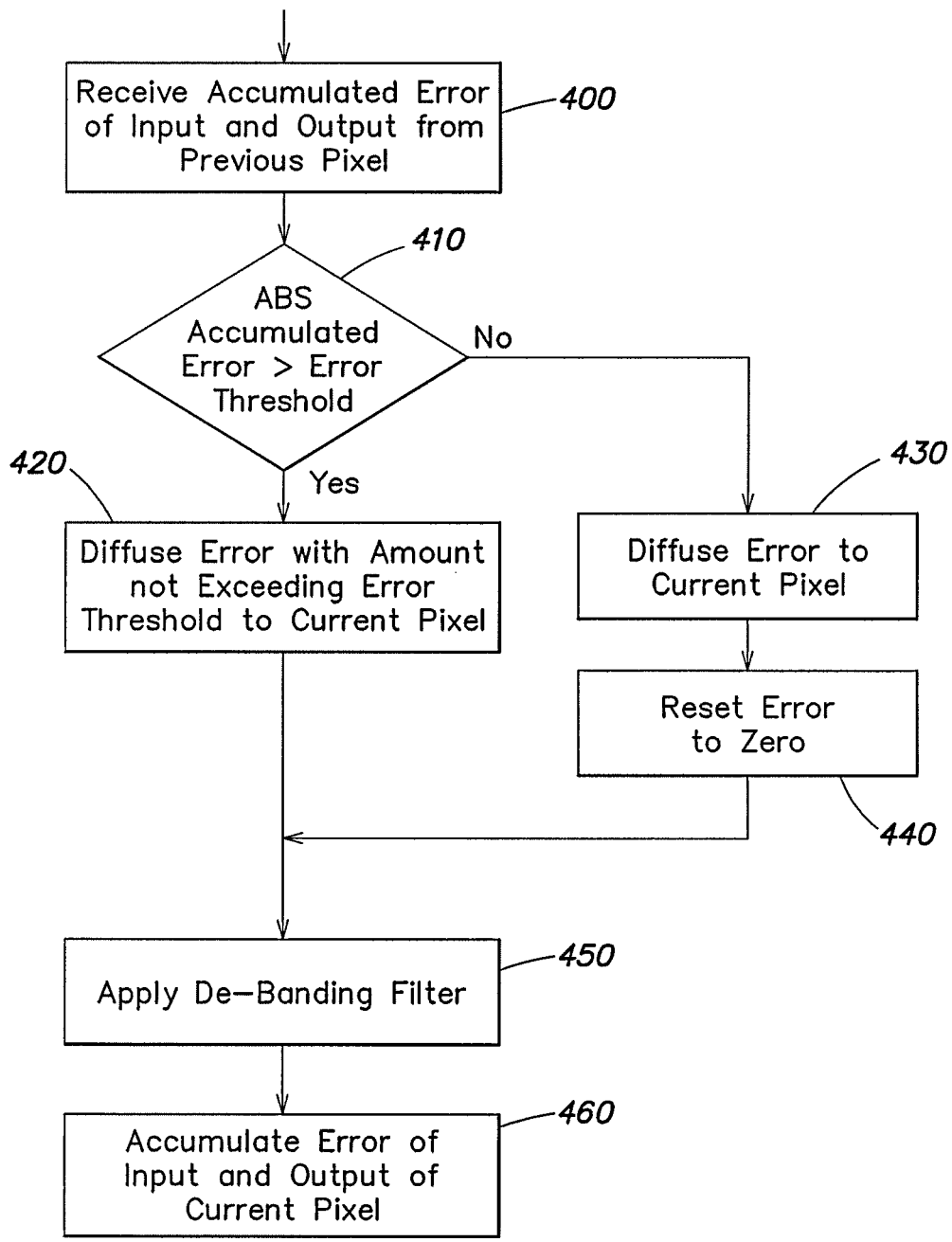
FIG. 7 is a flow chart of a recursive debanding filtering process incorporating error diffusion, in accordance with embodiments.

A recursive debanding filter in accordance with further embodiments is shown in FIG. 7. The filter of FIG. 7 incorporates error diffusion for improved image quality. FIG. 7 is a flow chart of a process of a recursive debanding filter with error diffusion. In act 400, an accumulated error value is received from the previously processed pixel. The accumulated error value is an error between the input pixel value and the filtered output value from the previous pixel. In act 410, the absolute value of the accumulated error is compared with an error threshold ETh. The error threshold Eth may be selected empirically or may be selected automatically based on the banding step jump and/or the banding width. If the absolute value of the accumulated error is greater than the error threshold, the error is diffused to the current pixel in act 420, with an amount not exceeding the error threshold. The pixel value with diffused error is given by $$\begin{cases} I_e(x, y) = I(x, y) + ETh, & err\ -= ETh & \text{if } err > ETh \\ I_e(x, y) = I(x, y) - ETh, & err\ += ETh & \text{if } err < (-ETh) \\ I_e(x, y) = I(x, y) + \text{error}, & err = 0 & \text{otherwise} \end{cases} \quad (11)$$

where $I_e(x,y)$ is the pixel value with diffused error.

If the absolute value of the accumulated error is not greater than the error threshold, as determined in act 410, the error value err is diffused to the current pixel in act 430, as shown in equation (11). Then the error err is set to 0 in act 440, as further shown in equation (11). Following act 420 or 440, the recursive debanding filter is applied in act 450. An embodiment of the recursive debanding filter is as follows:

$$F_v(x, y) = \frac{[32 - A(x, y)] \cdot I_e(x, y) + A(x, y) \cdot I'(x, y-1)}{32} \quad (12)$$

where A(x,y) is the adaptively selected filter weight, $I_e(x,y)$ is the error diffused pixel value as shown in equation (11), and I'(x,y-1) is the sigma-controlled previous pixel value, as shown in equation (9) above. Following application of the debanding filter in act 450, the error between the input value and the filtered output value of the current pixel is accumulated in act 460. The accumulated error err is calculated as follows:

$$\text{err} += [I_e(x,y) - F_v(x,y)] \tag{13}$$

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for filtering banding noise in a signal representative of an image, comprising:
    detecting, by a banding noise detector, banding noise in a neighborhood of a current pixel of the image;
    determining, by an adaptive filter weight decision unit, a number of banding steps in the neighborhood of the current pixel;
    determining, by the adaptive filter weight decision unit, a difference between a current pixel value and a previous output value;
    selecting, by the adaptive filter weight decision unit, a filter weight based on the number of banding steps, the difference between the current pixel value and the previous output value, and the detected banding noise; and
    filtering, by a recursive filter, the current pixel value according to the selected filter weight.

2. A method for filtering banding noise as defined in claim 1, wherein determining the number of banding steps comprises determining a count of increment steps in pixel values and a count of decrement steps in pixel values along a filter direction in the neighborhood of the current pixel and determining the number of banding steps in the neighborhood of the current pixel based on the count of increment steps and the count of decrement steps.

3. A method for filtering banding noise as defined in claim 1, further comprising controlling the selected filter weight near a boundary between a banding noise zone and a texture zone to produce a desired transition of filter weights between the banding noise zone and the texture zone.

4. A method for filtering banding noise as defined in claim 1, further comprising controlling the selected filter weight near a boundary between a banding noise zone and a texture zone based on a distance between the current pixel and a nearest pixel in the texture zone.

5. A method for filtering banding noise as defined in claim 1, further comprising performing the detecting, the determining, the selecting and the filtering for each pixel of the image in a vertical direction.

6. A method for filtering banding noise as defined in claim 1, wherein selecting a filter weight comprises accessing a look-up table of filter weights based on the number of banding steps and the difference between the current pixel value and the previous output value.

7. A method for filtering banding noise as defined in claim 1, wherein filtering the current pixel value comprises filtering the current pixel value with an infinite impulse response filter.

8. A method for filtering banding noise as defined in claim 1, wherein filtering the current pixel value further comprises performing error diffusion of the current pixel.

9. A method for filtering banding noise as defined in claim 8, wherein performing error diffusion comprises receiving an accumulated error from a previous pixel, diffusing the error to the current pixel with an amount not exceeding the error threshold, resetting the error if the error is fully diffused or adjusting the error with the diffused amount if the error is not fully diffused, and accumulating the error of the current pixel.

10. A computer-readable storage device encoded with computer-executable instructions that, when executed by a processing device, perform the method of claim 1.

11. Apparatus for filtering banding noise in a signal representative of an image, comprising:
    a banding noise detector configured to detect banding noise in a neighborhood of a current pixel of the image;
    an adaptive filter weight decision unit configured to:
        determine a number of banding steps in the neighborhood of the current pixel;
        determine a difference between a current pixel value and a previous output value; and
        select a filter weight based on the number of banding steps, the difference between the current pixel value and the previous output value, and the detected banding noise; and
    a recursive debanding filter configured to filter the current pixel value according to the selected filter weight.

12. Apparatus for filtering banding noise as defined in claim 11, wherein adaptive filter weight decision unit is configured to determine the number of banding steps by determining a count of increment steps in pixel values and a count of decrement steps in pixel values along a filter direction in the neighborhood of the current pixel and determining the number of banding steps in the neighborhood of the current pixel based on the count of increment steps and the count of decrement steps.

13. Apparatus for filtering banding noise as defined in claim 11, wherein the adaptive filter weight decision unit is further configured to control the selected filter weight near a boundary between a banding noise zone and a texture zone to produce a desired transition of filter weights between the banding noise zone and the texture zone.

14. Apparatus for filtering banding noise as defined in claim 11, wherein the adaptive filter weight decision unit is further configured to control the selected filter weight near a boundary between a banding noise zone and a texture zone based on a distance between the current pixel and the nearest pixel in the texture zone.

15. Apparatus for filtering banding noise as defined in claim 11, wherein the adaptive filter weight decision unit is further configured to perform the determining and the selecting for each pixel of the image in a vertical direction.

16. Apparatus for filtering banding noise as defined in claim 11, wherein the adaptive filter weight decision unit is configured to select a filter weight by accessing a lookup table of filter weights based on the number of banding steps and the difference between the current pixel value and the previous output value.

17. Apparatus for filtering banding noise as defined in claim 11, wherein the recursive debanding filter is configured to filter the current pixel value by filtering the current pixel value with an infinite impulse response filter.

18. Apparatus for filtering banding noise as defined in claim 11, wherein the recursive debanding filter is configured to filter the current pixel value by performing error diffusion of the current pixel.

19. Apparatus for filtering banding noise as defined in claim 18, wherein performing error diffusion comprises receiving an accumulated error from a previous pixel, diffusing the error to the current pixel with an amount not exceeding the error threshold, resetting the error if the error is fully diffused or adjusting the error with the diffused amount if the error is not fully diffused, and accumulating the error of the current pixel.

\* \* \* \* \*